US008956071B2

(12) United States Patent
Frey (10) Patent No.: US 8,956,071 B2
(45) Date of Patent: Feb. 17, 2015

(54) QUICK RELEASE JOINT SYSTEM FOR ASSEMBLING FRAMES

(75) Inventor: Robert M. Frey, Salt Lake City, UT (US)

(73) Assignee: Moss Holding Company, Elk Grove Village, IL (US)

(*) Notice: Subject to any disclaimer, the term of this patent is extended or adjusted under 35 U.S.C. 154(b) by 280 days.

(21) Appl. No.: 12/703,526

(22) Filed: Feb. 10, 2010

(65) Prior Publication Data
US 2010/0202827 A1 Aug. 12, 2010

Related U.S. Application Data (60) Provisional application No. 61/152,213, filed on Feb. 12, 2009, provisional application No. 61/180,741, filed on May 22, 2009.

(51) Int. Cl.
F16B 12/00 (2006.01)
A47G 1/10 (2006.01)

(52) U.S. Cl.
CPC .......................................... *A47G 1/10* (2013.01)
USPC ........... 403/382; 403/205; 403/231; 403/295; 403/401; 403/402

(58) Field of Classification Search
USPC .......... 403/205, 231, 238, 239, 292, 294, 295, 403/314, 359.3, 401, 402, DIG. 10, 297, 403/DIG. 12, 382
See application file for complete search history.

(56) References Cited

U.S. PATENT DOCUMENTS

| 1,659,101 | A | * | 2/1928 | Harvey | 403/401 |
| 1,994,022 | A | * | 3/1935 | Huff | 403/274 |
| 2,155,729 | A | * | 4/1939 | Mainieri | 403/382 |
| 2,601,734 | A | * | 7/1952 | Couzinet | 40/790 |
| 2,874,420 | A | * | 2/1959 | Henderson | 52/211 |
| 3,302,351 | A | * | 2/1967 | Trulaske | 52/309.1 |
| 3,574,367 | A | * | 4/1971 | Jankowski | 403/201 |
| 3,830,278 | A | * | 8/1974 | Packer | 160/378 |
| 3,955,298 | A | * | 5/1976 | Kapstad | 40/782 |
| 4,154,034 | A | * | 5/1979 | Bursk et al. | 52/213 |
| 4,179,830 | A | * | 12/1979 | Lamb | 38/102.5 |
| 4,207,707 | A | * | 6/1980 | Holdiman et al. | 49/501 |
| 4,345,849 | A | * | 8/1982 | Stenemann | 403/252 |
| 4,352,588 | A | * | 10/1982 | Davies, III | 403/382 |
| 4,455,103 | A | * | 6/1984 | Hackenberg | 403/190 |
| 4,572,694 | A | * | 2/1986 | Hoeksema | 403/187 |

(Continued)

FOREIGN PATENT DOCUMENTS

WO WO 9725536 A1 * 7/1997 ................ F16B 7/04

*Primary Examiner* — Daniel P Stodola
*Assistant Examiner* — Matthew R McMahon
(74) *Attorney, Agent, or Firm* — Lance M. Pritikin (57) ABSTRACT

A frame joint system including a first frame member and a second frame member. The frame members include laterally opening channels running axially thereof. The frame members are adapted to be rigidly secured together by quick release coupling. Embodiments of the frame joint system include mitered corner, end-to-face, face-to-face and end-to-end joints. The quick release coupling includes at least a first sleeve member and a gripping member. The gripping member is nested within the first sleeve member, and the first sleeve member is nested within the first frame member. The gripping member includes gripping elements that mate with a slot in a box rail element fixedly associated with the second frame member. Activating the gripping elements pulls the two frame members together into a rigid joint.

13 Claims, 10 Drawing Sheets

(56) References Cited

U.S. PATENT DOCUMENTS

| | | | | |
|---|---|---|---|---|
| 4,624,599 A * | 11/1986 | Piasecki | | 403/178 |
| 4,637,147 A * | 1/1987 | Wolsey | | 38/102.1 |
| 4,664,548 A * | 5/1987 | Brinkmann | | 403/14 |
| 4,684,282 A * | 8/1987 | Lever | | 403/219 |
| 4,739,600 A * | 4/1988 | Lynch et al. | | 52/656.9 |
| 4,799,819 A * | 1/1989 | Swoboda | | 403/252 |
| 4,907,388 A * | 3/1990 | Siahatgar | | 403/252 |
| 4,943,180 A * | 7/1990 | Durhman | | 403/295 |
| 4,974,987 A * | 12/1990 | Smock | | 403/252 |
| 4,993,866 A * | 2/1991 | Sugihara et al. | | 403/402 |
| 5,297,891 A * | 3/1994 | Rosa | | 403/402 |
| 5,473,853 A * | 12/1995 | Guillemet et al. | | 403/402 |
| 5,603,585 A * | 2/1997 | Bruchu et al. | | 403/382 |
| 6,106,183 A * | 8/2000 | Strassle et al. | | 403/252 |
| 6,148,569 A * | 11/2000 | Giovannetti | | 403/297 |
| 6,334,732 B1 * | 1/2002 | Strassle et al. | | 403/321 |
| 6,415,568 B1 * | 7/2002 | Lingenfelder et al. | | 52/240 |
| 6,442,805 B2 * | 9/2002 | Pfister | | 24/514 |
| 6,520,240 B2 * | 2/2003 | Sooklaris | | 160/379 |
| 2006/0042141 A1 | 3/2006 | Hansen et al. | | |
| 2009/0003928 A1 * | 1/2009 | Ohrstrom | | 403/205 |
| 2011/0280655 A1 * | 11/2011 | Maertens et al. | | 403/375 |

\* cited by examiner

QUICK RELEASE JOINT SYSTEM FOR ASSEMBLING FRAMES

RELATED APPLICATIONS

This application claims the benefit of U.S. Provisional Application No. 61/152,213 filed Feb. 12, 2009 and U.S. Provisional Application No. 61/180,741 filed May 22, 2009, the content of each of which is incorporated by this reference in its entirety for all purposes as if fully set forth herein.

TECHNICAL FIELD OF THE INVENTION

The present invention relates generally to the field of display frame joints, particularly to quick disconnect frame joints that are useful in forming mitered corners, end-to-face joints, face-to-face joints and end-to-end joints in display frames.

BACKGROUND OF THE INVENTION

Frames, for example, display frames, generally comprise a series of generally straight frame members joined through mitered joints so as to form a closed figure such as a rectangle, or the like. The structural integrity of the frame depends on the rigidity and durability of the joints between the frame members. Previously, various expedients had been proposed for providing rigid durable corner joints. These had included, for example, one or more "L" shaped brackets at each joint mounted to both of the mating frame members and extending across the joint, and interlaced fingers engaged with one another generally along the plane of the joint. Where frames were intended to be disassembled and reassembled with some frequency, the "L" shaped brackets where generally mounted with screws or other fasteners that secured them to the respective mating frame members. When the brackets and fasteners were separated from the frames upon disassembly, it was necessary to keep track of them so they would be available the next time the frame was to be assembled. A missing bracket or screw could prevent the assembly of the frame. In those prior expedients with interlaced fingers, the interlaced fingers were sometimes retractable to release the mating frame members from engagement with one another. The interengaged fingers and "L" shaped brackets were required to carry the torsional loads that the frame was exposed to. If the fingers or brackets failed, the entire frame became useless until they were repaired. The attachment locations of the brackets and fingers on the respective frame members tended to become worn so the joints could no longer be made tight. Various previous expedients for joining frame components at locations other than at corner joints have presented similar deficiencies. By way of example, expedients for securing end-to-end, end-to-face and face-to-face joints have commonly relied on straight, "L" shaped or "T" shaped brackets with mounting screws or other fasteners.

Those in the art concerned with these matters recognized the need for improved frame joint systems.

SUMMARY OF THE INVENTION

In embodiments, a frame joint system is provided. Embodiments of the frame joint system find utility in many applications where rigid corners and other frame intersections are desired. Embodiments of the frame joint system include a quick release coupling to secure a mitered corner joint or other frame joints together. In some embodiments the quick release coupling includes first and second sleeve members and a gripping member. The frame joint system provides improvements in safety, reliability, ruggedness, ease of assembly and disassembly, rigidity, ease of manufacturing, and functionality. Embodiments provide improved functionality, particularly when the embodiments are used in temporary display systems that are frequently moved, erected, handled, and disassembled. Improvements are achieved by reducing the number and complexity of the parts, which improves reliability and reduces cost. A minimum number of operations are required to manufacture and install the components, thus reducing costs and improving quality. Simplicity of assembly and disassembly, rigidity, and durability are of great significance in certain applications such as, for example, temporary displays.

In embodiments that are particularly suited for use, among other uses, in frames in temporary displays, the frame joint system allows the quick and repeated erection, handling, and disassembly of even large display frames in the order of six feet by ten feet, or larger. The existence of rigid joints permits the handling of an assembled frame without damaging it.

The elements of a quick release coupling are generally permanently assembled to frame members so there are no loose parts to keep track of as the disassembled frame is moved from one location to another. In particular embodiments, for example, once the mitered ends of the respective frame members are brought into alignment with one another, a twist of a simple hand tool moves gripping elements in a gripping member between disengaged and engaged configurations. This locks the frame members into an assembled relationship. According to certain embodiments, similarly assembling three other joints between frame members quickly and easily secures the frame members into a substantially rigid generally rectangular frame. The assembly of the entire frame typically takes less than a minute. Disassembly is generally even quicker.

In embodiments, rigidity in the assembled joints is accomplished by using a quick release coupling in which, among other things, the area of gripping engagement is removed both spatially and angularly from the plane of the joint, and the gripping elements themselves are substantially protected from torsional forces. According to certain embodiments this spatial and angular separation from the joint plane is accomplished by the use of a quick release coupling that includes sleeve members nested in frame members, and a gripping member nested in a sleeve member. The gripping member is quickly actuatable between engaged and disengaged configurations.

Embodiments that are particularly adapted for use in temporary displays include outwardly opening artifact mounting channels that extend through the mitered frame joints. Artifact mounting channels provide locations for securing artifacts to the assembled frame, including, for example, large expanses of fabric.

In certain embodiments, the frame joint system includes a first frame member that is elongated and hollow with a first longitudinal axis and first and second generally opposed ends. The first frame member has a substantially constant first cross-sectional profile including a first frame cavity extending generally axially therein. The first frame cavity, for example, has a generally closed cross-sectional profile and opens axially. The first frame member includes at least a first artifact mounting channel extending axially and opening laterally to provide for the mounting of artifacts. The first end is beveled at approximately a predetermined angle. In certain embodiments where a rectangular frame is intended, the second end is likewise beveled approximately at a predetermined angle.

According to certain embodiments, a first sleeve member is elongated and hollow with a longitudinal axis and proximal and distal ends. The first sleeve member has a substantially constant first sleeve cross-sectional profile including a sleeve cavity extending axially therein. The sleeve cavity has a generally closed cross-sectional profile and opens axially.

The first sleeve member is axially slidably received and retained in the first frame cavity with the proximal end of the first sleeve member adjacent to the first end of the first frame member, but not intersecting the joint plane. In certain embodiments, the proximal end extends to but not through the joint plane. When received within the frame cavity of the first frame member the longitudinal axis of the first sleeve member extends generally parallel to the first longitudinal axis of the first frame member.

According to certain embodiments, a quick disconnect gripping member takes the form, for example, of a cassette member that is axially slidably received and retained in the sleeve cavity in the first sleeve member. The retention of the gripping member in the sleeve cavity is permanent in the sense that it need not be removed from the sleeve cavity when the frame joint system is disassembled.

In certain embodiments, the gripping member includes a plurality of gripping elements that project beyond the proximal end of the first sleeve member when the gripping member is received in the sleeve cavity of that first sleeve member. The gripping elements in some embodiments are formed from a specially configured leaf spring member that is actuated by sliding movement within a housing member. The sliding movement is induced, for example, by the rotation of an eccentric element against a surface of the leaf spring member. In certain embodiments the gripping elements are aligned with one another so that together they define an area of gripping engagement that generally extends at an angle to and is spaced from the joint plane. The gripping elements are adapted to being actuated between gripping and released configurations.

According to certain embodiments, as the gripping elements are moved from the disengaged to the engaged configurations they perform a compound movement in which they spread apart, engage with, and draw a mating box rail element into firm engagement with a housing in which the gripping elements are mounted, or the proximal end of the first sleeve member, or both. This compound motion is reversed when the gripping elements are moved from the gripping configuration to the released configuration. According to certain embodiments, the area of gripping engagement over which the gripping elements engage the mating box rail element generally defines a plane that includes the surfaces of the box rail element that lie on either side of the lateral axially extending opening in the box rail element.

A second frame member includes a second longitudinal axis and first and second frame ends. The second frame member has a second cross-sectional profile that in some embodiments is substantially the same as the cross-sectional profile of the first frame member. A second frame cavity extends generally axially within the second frame member. The second frame member also includes at least a second artifact mounting channel extending axially of the second frame member and opening laterally thereof. In certain embodiments adapted to create a mitered joint, the first frame end is beveled at approximately a predetermined angle. In certain embodiments where a rectangular frame is desired, the second frame end is similarly beveled at approximately a predetermined angle. For a 90 degree mitered joint the respective mating frame ends that come together at the joint plane are each beveled at approximately 45 degrees.

According to certain embodiments, a second sleeve member has a second sleeve cross-sectional profile that in some embodiments is substantially similar to the first sleeve cross-sectional profile, and a second sleeve longitudinal axis. A box rail element opens laterally of and extends axially within the second sleeve member. In certain embodiments the proximal end of the second sleeve member extends generally normal to the direction in which the lateral opening of the box rail element opens. This lateral opening of the box rail element generally parallels the longitudinal axis of the second sleeve member. The second sleeve member is axially slidably received and retained in the second frame cavity with the longitudinal axis of the second sleeve member extending either generally parallel to or perpendicular to the longitudinal axis of the second frame member. In some embodiments, the second sleeve member projects axially outwardly from a beveled frame end of the second frame member and through the joint plane. The respective beveled ends of the first and second frame members are adapted to mate with one another with the gripping elements of the gripping member that is associated with the first frame member in a gripping configuration with the second box rail element that associated with the second frame member. In certain embodiments, at least the first and second artifact mounting channels extend substantially continuously through the joint plane.

In certain embodiments, the frame joint extends at approximately 45 degrees to the longitudinal axes of the mated frame members. According to further embodiments, the gripping member is axially slidably received and releasably retained in the sleeve cavity. According to some embodiments, the first and second sleeve members are substantially shorter than the first and second frame members in which they are mounted. In general, the respective sleeve members need only be of sufficient axial length so that when retained in the respective frame cavities and releasably engaged in a joint system, they are substantially prevented from lateral or rotational movement in the respective frame members in which they are nested.

Embodiments comprise a frame joint system that includes a rigid quick disconnect joint. The frame joint system includes first and second frame members. The first and second frame members are elongated, they have major axes, and in mitered corner embodiments they include beveled ends. The beveled ends of the respective frame members are adapted to being abutted against one another generally along a joint plane to define an approximately right angled mitered joint. The first frame member includes therein a socket portion adjacent to the beveled end of the first frame member. Certain embodiments of the frame joint system also include a sleeve member with a laterally opening axially extending box rail element. The sleeve member is mounted generally within the second frame member so that it projects generally axially beyond the beveled end of the second frame member. The sleeve member is adapted to project generally laterally into the socket portion in the first frame member. A gripping member is mounted generally within the first frame member. The gripping member includes a plurality of gripping elements that are located within the socket portion and separated spatially and angularly from the joint plane. The gripping elements are adapted to engage the laterally opening axially extending box rail element when the sleeve member is projected into the socket portion. The gripping elements are adapted to being actuated between a gripping configuration and a released configuration with respect to the box rail element.

Embodiments of the frame, sleeve, and gripping members may be constructed of various materials, including, aluminum alloys, engineering plastics, stainless steel, or the like. The materials will be selected by those skilled in the art of quick disconnect frame structures depending on such factors as the intended operating environment (corrosive, abrasive, impact, or the like), anticipated assembly conditions, and the like, as specific applications may dictate.

If a teaching of a reference or application herein incorporated by reference contradicts or is inconsistent with a teaching that is expressly set forth in the present application, the express teaching in the present application shall control.

The detailed description of embodiments of the frame joint system is intended to serve merely as examples, and is in no way intended to limit the scope of the appended claims to these described embodiments. Accordingly, modifications to the embodiments described are possible, and it should be clearly understood that the invention may be practiced in many different ways than the embodiments specifically described below, and still remain within the scope of the claims.

BRIEF DESCRIPTION OF THE DRAWINGS

Further advantages of the present invention may become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications.

DETAILED DESCRIPTION OF THE INVENTION

The following description of the best mode presently known generally relates to a system in which one quick release frame joint system holds two mating frame members in a strong, safe, rugged, and easily assembled and disassembled structural relationship.

Figure 1:
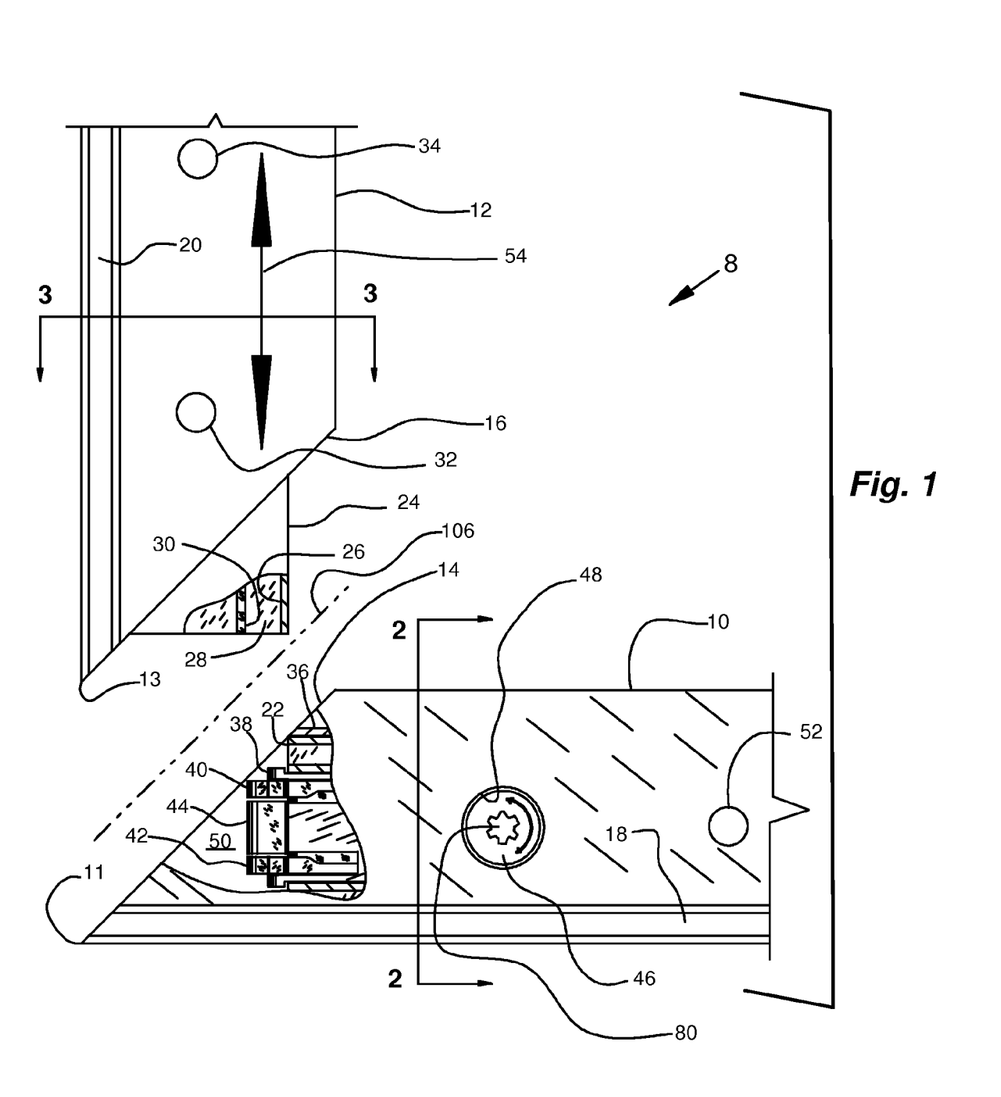
FIG. 1 is a broken partial plan view depicting a pair of mating frame members in position for assembly to one another along a joint plane into a right angle mitered joint.

With particular reference to the accompany drawings; in the embodiment of a frame joint system 8 illustrated in FIG. 1, a first frame member is indicated at 10 and a second frame member is indicated at 12 (see, for example, FIGS. 1-3, and 4). First beveled end 14 of first frame member 10 is beveled at approximately 45 degrees, and beveled first frame end 16 of second frame member 12 is likewise beveled at approximately 45 degrees. When these beveled ends are brought together, a 90 degree mitered joint is formed along joint plane 106. In the assembled configuration, first toe element 11 of first frame member 10 is in registry with second toe element 13 of second frame member 12 so that the laterally opening channels in the respective frame members are in registry with one another, as illustrated, for example, by the registry of first channel 18 with second channel 20. The laterally opening channels are thus continuous through the mitered joint. Web 36 provides rigidity to first frame member 10, and also confines first sleeve member 22, when it is nested within first frame member 10, against lateral or angular motion relative to the frame member.

In the embodiment of a frame joint system 8 illustrated in FIG. 1, the respective frame members are secured together by way of a quick release coupling comprised of first and second sleeve members 22 and 24, and a gripping member 56 (see, for example, FIGS. 1-3, and 4). Gripping member 56 is nested within first sleeve member 22, and first sleeve member 22 is nested within first frame member 10. Second sleeve member 24 is nested within second frame member 12. In an assembled configuration, one end of second sleeve member 24 (e.g., a generally triangular boss portion of the second sleeve member as shown, for example, in FIG. 1) projects through joint plane 106 and into socket portion 50 of first frame cavity 69 so that box rail element 26 is presented for gripping engagement with gripping elements 40, 42, and 44 in an approximately right angle gripping configuration. As illustrated in FIG. 1, the box rail element 26 may extend substantially parallel to the second artifact mounting channel 20. More specifically, in embodiments in which the first frame end 16 is beveled at a 45 degree angle, the box rail element 26 may extend at approximately a 45 degree angle with respect to the beveled first frame end 16. Also as illustrated, the box rail element 26 may extend in non-parallel fashion with respect to the beveled end 16 of the second frame member 12. As illustrated in FIG. 1, the socket portion 50 of the first frame cavity 69 may extend from the first sleeve member 22 through the beveled first end 14. Socket portion 50 receives the second sleeve member 24 in close fitting sliding engagement so that the sleeve member prevents the mated frame members from rotating out of the joint plane. This removes the gripping elements both angularly and spatially from the joint plane 106. It also brings the external side walls of second sleeve member 24 into close sliding engagement with the internal side walls of first frame cavity 69. First frame cavity 69 has about the same internal dimensions as second frame cavity 64, and second sleeve member 24 has about the same external dimensions as first sleeve member 22. Torsional rigidity is thus imparted to the mitered joint that is formed between the respective frame members, and the gripping elements are protected from experiencing substantial, and potentially destructive torsional forces.

According to certain embodiments, the frame and sleeve members are elongated and hollow with substantially constant cross-sectional configurations throughout their lengths. In further embodiments, the cross-sectional configurations and the sizes of the mating frame members are substantially the same. Likewise, in additional embodiments, the cross-sectional and the sizes of the sleeve members are substantially the same. The frame and sleeve members are conveniently formed, for example, by extrusion through a die with the desired cross-section. For the sake of clarity and convenience, only the mating ends of two frame members, two sleeve members, and one quick release coupling are illustrated in FIGS. 1 through 9. As will be understood by those skilled in the art, multiple members and couplings are generally required to assemble a desired frame with multiple joints.

Figure 2:
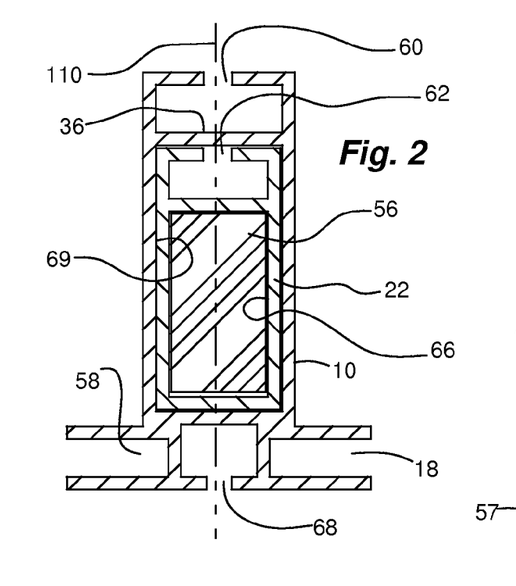
FIG. 2 is a cross-sectional view of a first frame member taken along line 2-2 in FIG. 1.

Gripping member 56 is slidably axially received and retained in sleeve cavity 66 in first sleeve member 22 (see, for example, FIG. 2). In the embodiment of a frame joint system 8 illustrated in FIG. 1, first sleeve member 22 is slidably axially received in and retained in first frame cavity 69 of frame member 10. Gripping member 56 includes a plurality of gripping elements 40, 42, and 44. These gripping elements project axially outward of the end of first sleeve member 22, but within first frame cavity 69.

In the embodiment selected for illustration in FIGS. 1-9, second sleeve member 24 is slidably axially received and retained in second frame cavity 64, which is in second frame member 12. An end of second sleeve member 24 projects outwardly beyond frame cavity 64. Second sleeve member 24 includes a box rail element 26. The end of second sleeve member 24 projects from the beveled end of second frame member 12 with slot 62 in box rail element 26 positioned to releasably engage with gripping elements 40, 42, and 44. The beveled first and first frame ends 14 and 16 of frame members 10 and 12, respectively, are mated together to form a mitered corner by moving frame member 12 as indicated at 54 until the beveled ends meet with toe elements 11 and 13 together. Gripping elements 40,42, and 44 are then moved to grip box rail element 26. Box rail element 26 includes a box rail cavity 28. Wall 30 of box rail element 26 is spaced far enough from slot 62 to permit the gripping elements to be fully inserted into box rail cavity 28. In the gripping configuration the gripping elements bear against the inside surfaces of box rail element 26 adjacent to and on either side of slot 62, and clamp box rail element 26 against the end of housing member 57 and/or the end of sleeve member 24.

In the embodiments chosen for illustration purposes, a prior art gripping member is illustrated. Any gripping member may be used that functions to firmly and reliably hold one sleeve member against the other at a location that is spatially and angularly spaced from joint plane 106, and is quickly actuatable between released and gripping configurations. Gripping member 56 comprises a housing member 57, a leaf spring member 76 that is specially configured, and an eccentric member 46 (see, for example, FIGS. 4-7). Leaf spring member 76 is mounted for axial movement within housing member 57. Eccentric member 46 is rotatably mounted in housing member 57, as indicated at 90. Rotation of eccentric member 46 in housing member 57 causes leaf spring member 76 to move axially as indicated at 78. Housing member 57 includes cam blocks 92, 96, and 100 (see, for example, FIG. 7) with cam surfaces 94, 98, and 102, respectively, that camingly engage spring finger elements 89, 86, and 88. The spring finger elements are part of leaf spring member 76. As leaf spring member 76 moves axially of housing member 57 under the urging of eccentric member 46, the spring finger elements move relative to the respective cam surfaces with which they are camingly engaged. The spring finger elements terminate in gripping elements 44, 40, and 42, respectively. The gripping elements project beyond the housing member, and are adapted to grippingly engage a box rail element such as box rail element 26 (see, for example, FIGS. 1-3, 8, and 9). The actuating rotation of eccentric member 46 is effected, for example, by the rotation of a wrench (not shown) engaged in socket 80. For tensioning purposes part of spring finger element 89 is divided into three leaves 82, 83, and 84.

As the spring finger elements move axially over the cam surfaces they are deflected laterally against the tension in the leaf spring member so the gripping elements move between gripping and released configurations relative to the box rail element. As the spring finger elements are moved to the gripping configuration, the gripping elements are moved laterally outwardly and drawn axially closer to the housing member so that a box rail element with which they are engaged is drawn tightly against the housing member. Reversing this action moves the gripping elements axially outwardly of the housing member and allows the tension in the leaf spring member to move the gripping elements laterally inwardly to release the engaged box rail element. The gripping elements may thus be adapted to being actuated with respect to the housing member.

The quick release coupling is retained in first sleeve member 22 through at least the engagement of eccentric member 46 in sleeve port 49. Sleeve port 49 is in the side of first sleeve member 22 (see, for example, FIGS. 1 and 4). In the fully assembled configuration, sleeve port 49 is in registry with port 48 in first frame member 10. Port 48 allows access to eccentric member 46. The rotation of eccentric member 46 actuates the gripping elements between gripping and released configurations. Eccentric member 46 projects into sleeve port 49 under the urging of leaf spring member 76. Depressing eccentric member 46 out of engagement with sleeve port 49, against the tension in leaf spring member 76, as indicated at 104 (FIG. 6), releases gripping member 56 to slide axially of sleeve cavity 66. Boss 38 and boss 39 project outwardly from opposed sides of housing member 57. Boss 38 defines shoulder 70. In the embodiment selected for illustration in FIGS.

1-9, for example, bosses 38 and 39 enter the slot 62 in box rail element 26 on either side of the gripping elements where they serve to prevent the gripping member 56 from twisting out of alignment with slot 62. This serves to rigidify the frame joint.

The several frame members, sleeve members and couplings are nested together in snug sliding fits to minimize any play that would impair rigidity. The sleeve members are generally secured to the respective frame members by bolts, rivets, adhesives, welds, or the like to provide a substantially rigid connection. See, for example, rivets 32, 34, and 52 in FIG. 1, and rivets 33 in FIGS. 12-26. These rivets engage rivet holes in the respective frame and sleeve members. Rivet hole 51 (FIG. 4) is typical. The snug fit between gripping member 56 and the sleeve cavity in which it is mounted minimizes any relative movement between the two. Also, when the gripping elements are drawn into full engagement with the mating box rail element, the tension between the two is such that there is very little play between them. The mating edges of the frame members are drawn into tight engagement by the tension between the gripping elements and the box rail element. This secures the frame members against rotational movement relative to one another.

Figure 8:
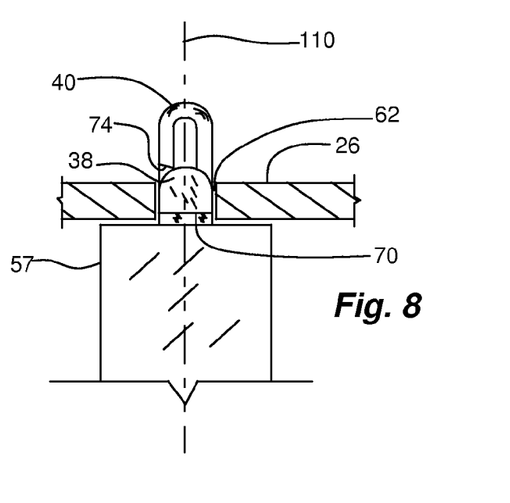
FIG. 8 depicts a broken partial cross-sectional view of a released set of gripping elements projecting from a housing member into a box rail element in a position to be tightened into a gripping configuration.
Figure 9:
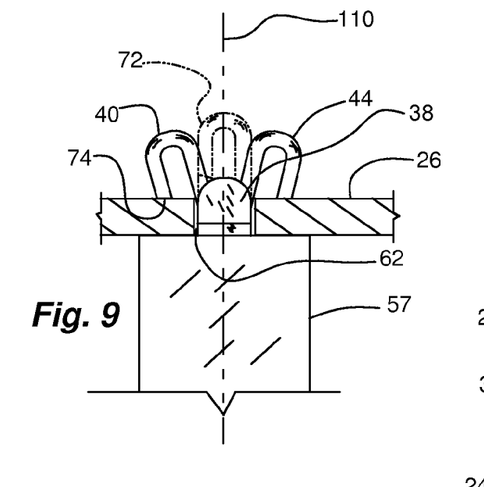
FIG. 9 depicts a broken partial cross-sectional view of a set of gripping elements in an engaged gripping configuration with a box rail element.

In the embodiment selected for illustration in FIGS. 1-9, and with particular reference to FIGS. 8 and 9, there is illustrated a set of gripping elements in the gripping (FIG. 9) and released (FIG. 8) configurations relative to a box rail element 26. Gripping element 40 includes a beveled end 74 that bears flat against the surface of box rail element 26 in the gripping configuration of FIG. 9. In FIG. 9 the position occupied by gripping element 40 in the released configuration is indicated in phantom at 72. The axial movement of leaf spring member 76 responsive to the rotation of eccentric member 46 draws the gripping elements down and laterally outwardly against the adjacent surface of box rail element 26. This pulls box rail element 26 tightly against the adjacent surface of housing member 57. The gripping elements provide tension to draw the mating frame surfaces tightly together so that frictional engagement between them prevents relative movement. The mating frame surfaces surround the gripping elements. The gripping elements do not need to provide torsional stability because they are spatially and angularly separated from the joint line itself. The gripping elements 40, 42, and 44, in the released configuration (see, for example, FIGS. 6 and 8) extend generally parallel to locking plane 110. When moving to the gripping configuration (see, for example, FIGS. 7 and 9) the gripping elements deflect outwardly at an angle to locking plane 110 as they are simultaneously drawn into engagement with a mating box rail element.

Figure 3:
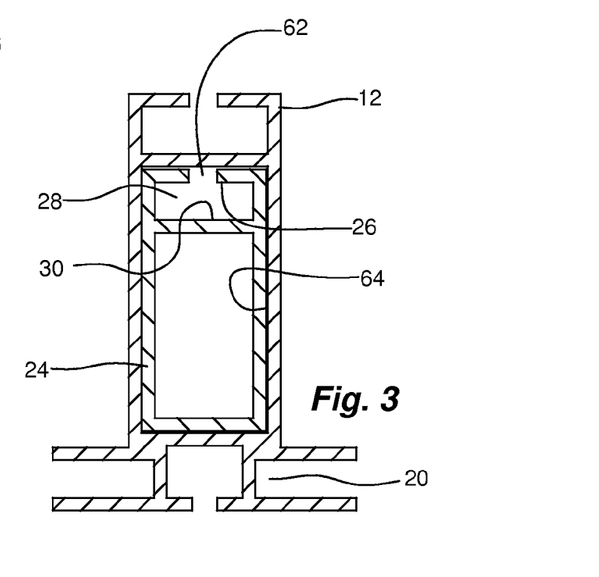
FIG. 3 is a cross-sectional view of a second frame member taken along line 3-3 in FIG. 1.
Figures 4, 5, 6, 7:
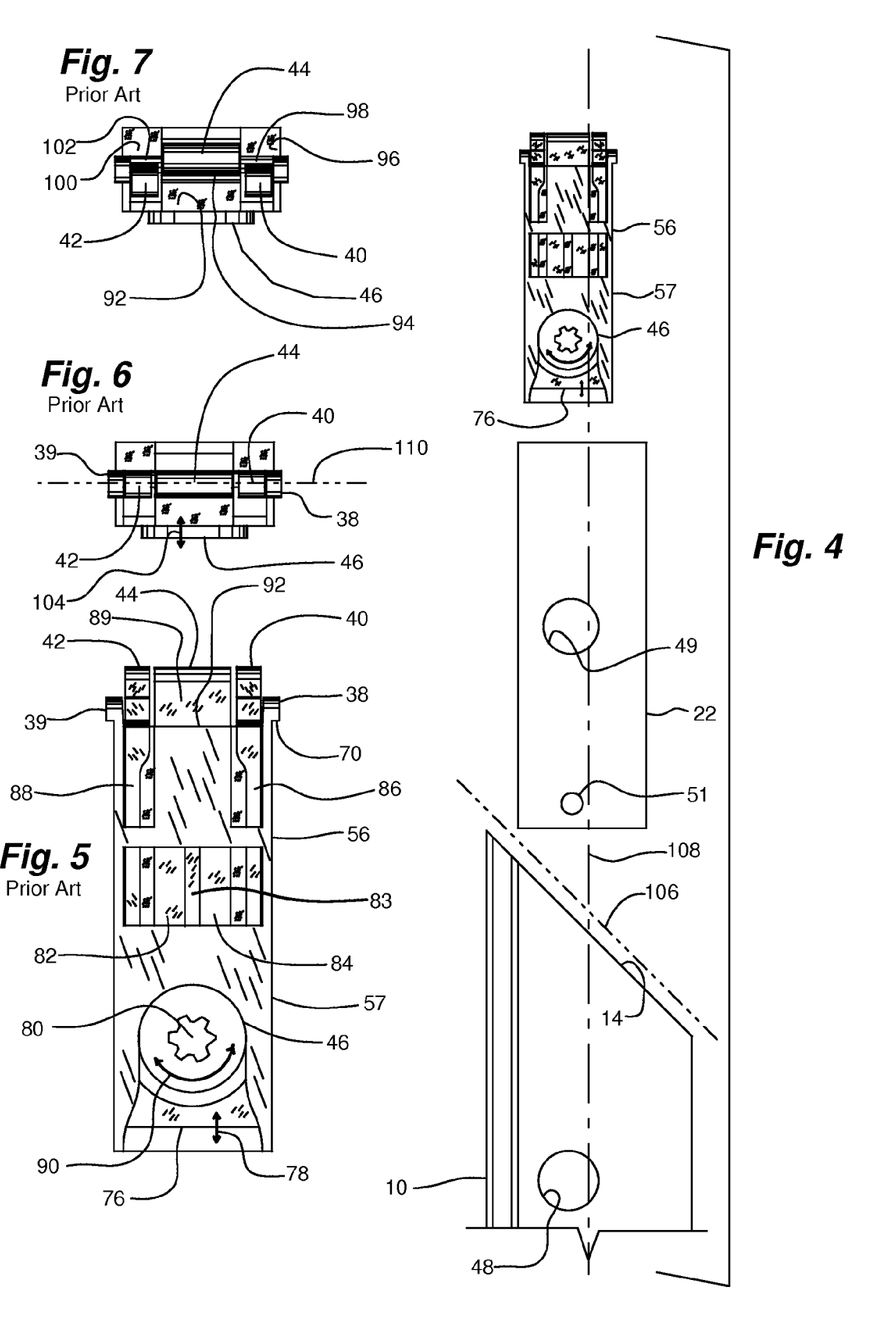
FIG. 4 is an exploded view depicting a first frame member and associated sleeve and gripping members.
FIG. 5 depicts a prior art cassette that is suitable for use as a gripping member according to the present invention.
FIG. 6 depicts an end view of a prior art cassette with gripping elements in a released configuration.
FIG. 7 depicts an end view of a prior art cassette with gripping elements in a gripping configuration.

In the embodiment selected for illustration in FIGS. 1-9, the respective mating beveled ends of first frame member 10 and second frame member 12, when in the assembled configuration, form a generally right angle mitered joint along joint plane 106 (see, for example, FIGS. 1 and 4). Joint plane 106 (see, for example, FIG. 4) extends at an angle to first longitudinal axis 108 of first frame member 10, first sleeve member 22, and gripping member 56. When the gripping elements 40, 42, and 44 are engaged with box rail element 26 (see, for example, FIGS. 1, 3, and 9) the end of second sleeve member 24 projects beyond the beveled end of second frame member 12 to define a generally triangular prismatic boss portion, and through joint plane 106 so that box rail element 26 extends substantially normal to first longitudinal axis 108. The gripping engagement between the gripping elements and the box rail element with which it mates occurs at a location that is axially spaced inwardly from the first beveled end 14 of first frame member 10, and within the frame cavity in first frame member 10.

Figure 16:
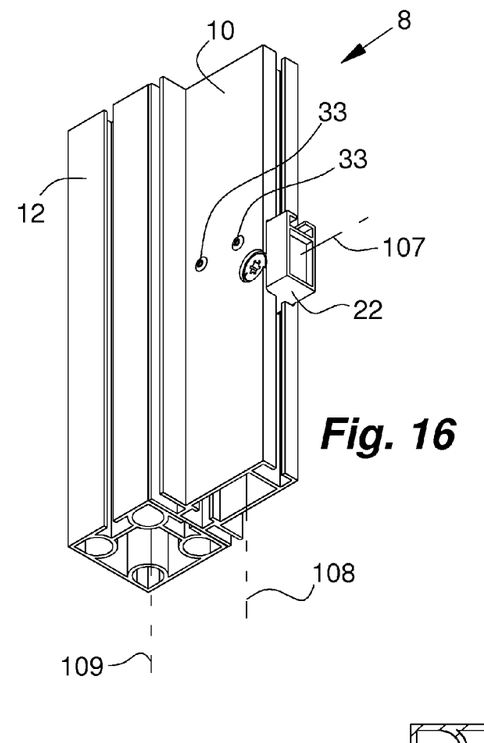
FIG. 16 is an isometric view of a further embodiment.
Figure 22:
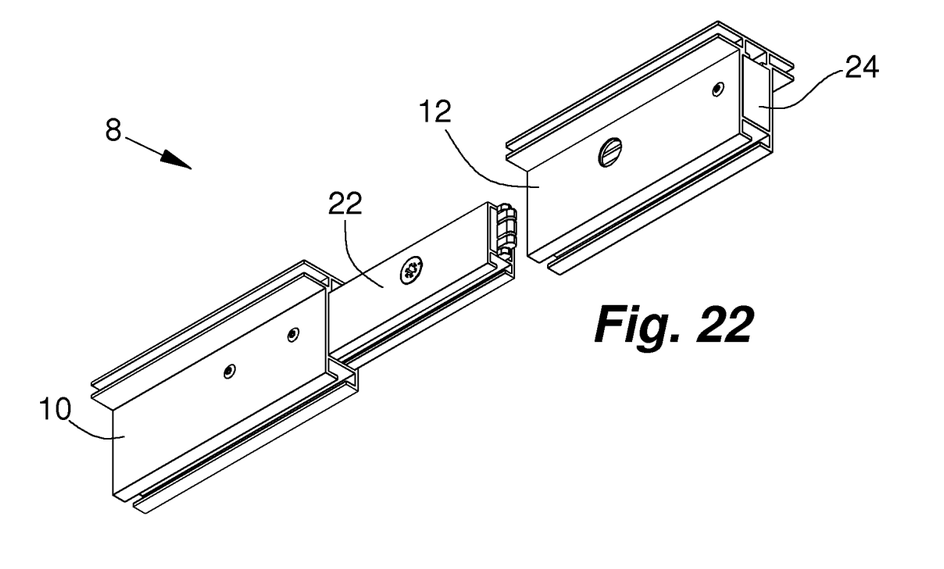
FIG. 22 is an isometric view of an additional embodiment where a first frame member and a second frame member are unmated with each other.
Figure 23:
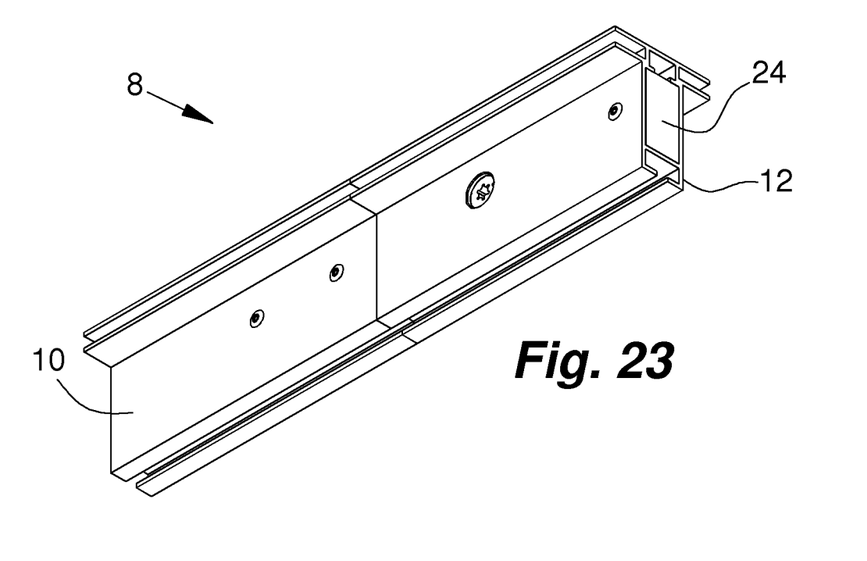
FIG. 23 is an isometric view of the embodiment of FIG. 22 where the first and second frame members are mated to each other.
Figure 24:
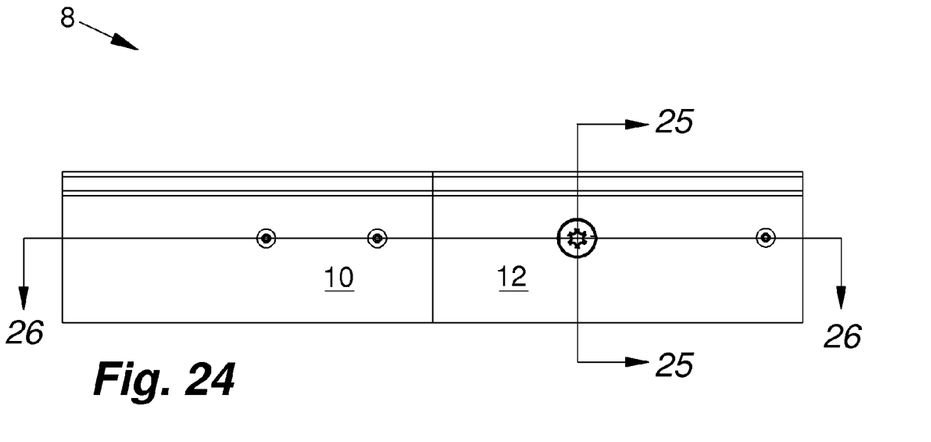
FIG. 24 is a side view of the embodiment of FIG. 23.
Figure 25:
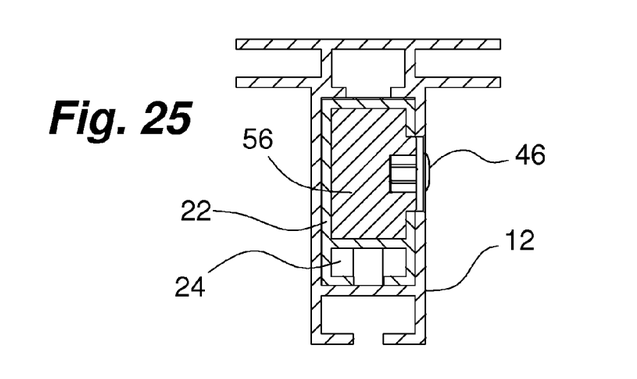
FIG. 25 is a cross-sectional view taken along line 25-25 of FIG. 24.
Figure 26:
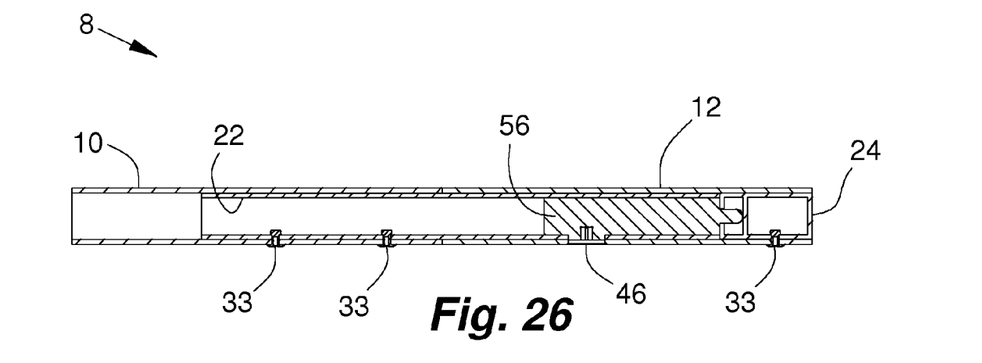
FIG. 26 is a cross-sectional view taken along line 26-26 in FIG. 24.

With particular reference to FIGS. 1-3, several elongated laterally opening channels are illustrated at 18, 20, 68, 58, and 60. In a typical application, these serve as mounting locations for various artifacts such as, for example, sheets of material upon which text and/or images are displayed. In such applications it is desired by the users that the channels be uninterrupted and continuous as they change directions at joints in the frames. Embodiments provide this desired feature, because the joints are secured together by coupling members that are internal to the assembled structure. Embodiments are sufficiently rigid that, for example, canvas can be stretched and the edges held in place in the channels without distorting the frames. The frames are robust enough to withstand hard usage in displays. Frames can be assembled and disassembled very quickly and easily. Frame members are brought together by hand as indicated in FIGS. 1, 16 and 22. Approximately a half turn of eccentric member 46 engages and tightens the gripping elements to the box rail element, and the joint is complete. Disassembly is accomplished by an approximate half turn of eccentric member 46. Because the gripping member is not subjected to rotational loads it has a very long useful life (hundreds of assembly and disassembly cycles).

Figures 10, 11:
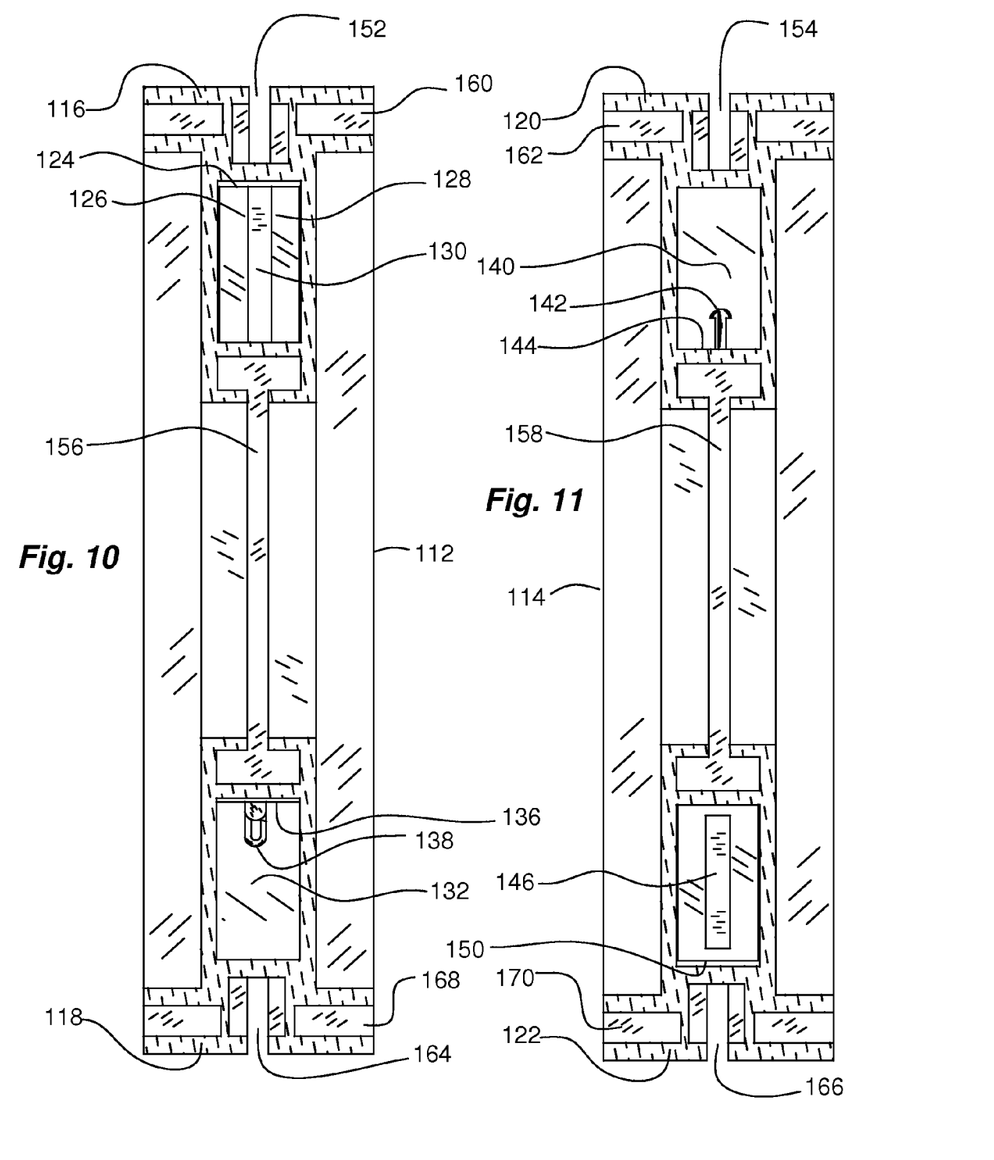
FIG. 10 depicts a diagrammatic top view of an embodiment of a complete frame member.
FIG. 11 depicts a diagrammatic top view of an additional embodiment of a complete frame member.
Figures 12, 13, 14:
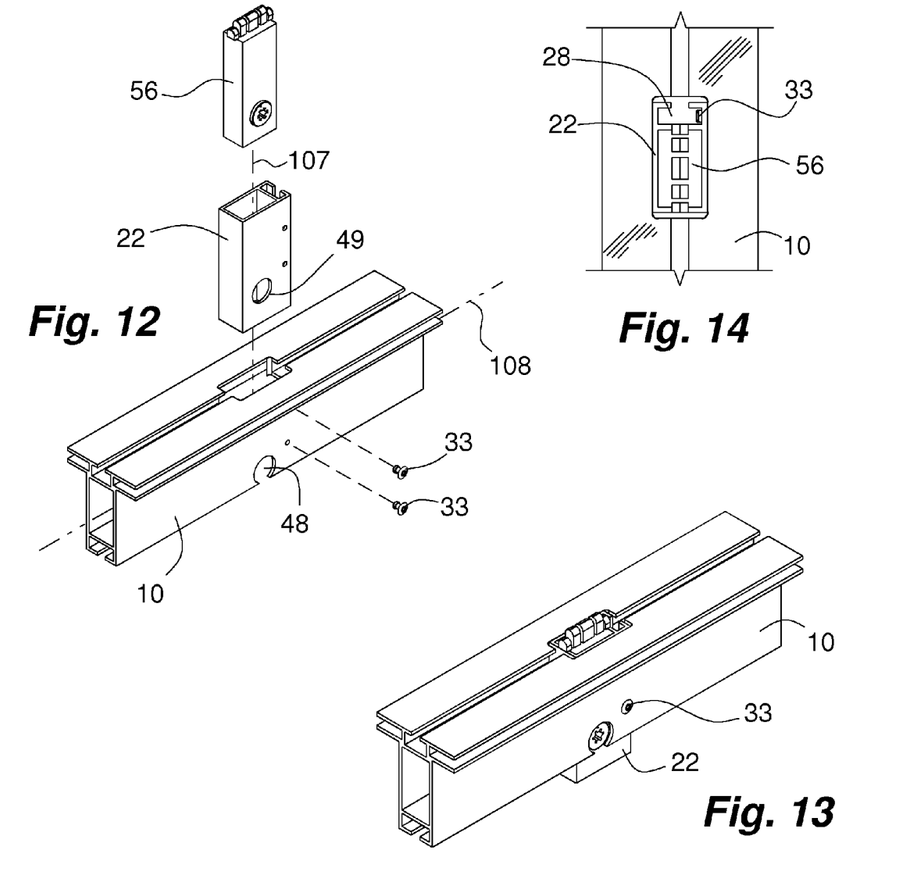
FIG. 12 is an exploded view depicting a first frame member and associated sleeve and gripping members of a further embodiment.
FIG. 13 is an isometric view depicting the components depicted in FIG. 12, but in assembled form.
FIG. 14 is a broken top view of the first frame member and associated sleeve and gripping members depicted in FIG. 13.
Figure 15:
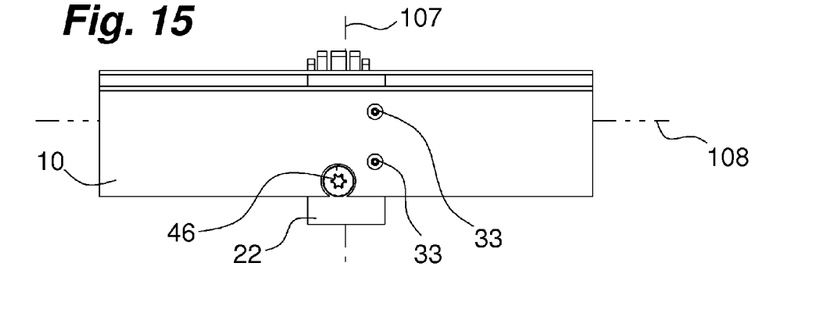
FIG. 15 is a side view of a first frame member and associated sleeve and gripping members depicted in FIG. 13.

With particular reference to FIGS. 10 and 11, there is illustrated frame members in which both ends of the frame members are beveled at approximately 45 degrees. These frame members are suitable, for example, for use in forming rectangular frames. If a rectangular frame is not desired, then the opposed ends of the frame members may be configured differently from that shown in FIG. 10 or 11.

Frame member 112 includes a first beveled end 116 and a second beveled end 118. Frame member 114 includes a first beveled end 120 and a second beveled end 122. Beveled ends 116 and 120 are adapted to being mated to form a mitered generally right angle joint. Likewise, beveled ends 118 and 122 are similarly so adapted. Box rail element 124 is mounted to frame member 112 so that it projects outwardly from first beveled end 116 through what would be the joint plane formed when frame members 112 and 114 are mated to one another. Box rail element 124 includes an axially extending slot 130, which is defined by axially extending rail elements 126 and 128. Adjacent second end 118 a socket portion 132 of frame member 112 opens laterally of the frame member. Gripping fingers 138 extend from a housing 136 into socket portion 132. When a box rail element, such as 124 on a different frame member, is inserted into socket portion 132, gripping fingers 138 are adapted to be actuated between gripping and released configurations with rails of the box rail element. The region in which the engagement occurs is generally separated both spatially and angularly from the joint plane between the mated frame members. In the embodiment chosen for illustration, the locations of this engagement between the gripping elements and the opposed rails of the box element generally define a plane that extends at an angle to the joint plane.

Frame member 114 includes a first beveled end 120 and a second beveled end 122. Socket portion 140 of frame member 114 opens laterally of the frame member similarly to socket portion 132. Gripping elements 142 project from area 144 of frame member 114. Gripping elements 142 function to grippingly engage the rails of a box rail element similarly to gripping elements 138. Adjacent to second end 122, box rail element 150 projects out of frame member 114 through where a joint plane would form when frame member 114 is mated to another frame member with an end constructed similarly to, for example, first end 120. Box rail element 150 includes a closed ended slot 146. Opposed rails are defined by the opposed sides of slot 146.

Laterally opening channels are provided on both frame members 112 and 114. These laterally opening channels serve to provide artifact attachment locations at various locations on a frame constructed from these frame members. When, for example, the respective first ends 116 and 120 are mated to form a mitered joint, gripping elements 142 enter slot 130 as box rail element 124 enters socket portion 50. Upon actuation, gripping elements 142 grippingly engage opposed rails 126 and 128 to draw box rail element 124 firmly against area 144. Area 144 may include other structure (not shown in this FIG. 11). Similarly, the engagement of second end 122 with a mating frame member, and the actuation of a quick disconnect coupling causes the two frame members to be drawn into firm engagement with one another. When so engaged the laterally opening channels extend continuously around the resulting frame. For example, The engagement of ends 116 and 120 permits laterally opening channels 152-154, 160-162, and 156-158 to continue through the joint uninterrupted. Where the artifacts to be mounted to the assembled frame have continuous edges or rims that are to be engaged with the frame, the continuous nature of the laterally opening channels is important to achieving the intended result. Similarly, the joinder of ends 118 and 122 permits laterally opening channels 164-166 and 168-170, for example, to continue uninterrupted around the frame.

FIGS. 12-18 illustrate components and configurations relating to a further embodiment of a frame joint system 8. Such a further embodiment is shown in mated configuration generally at 8 in FIGS. 16 and 17, and in cross-section in FIG. 18. As with other embodiments, first frame member 10 and second frame member 12 are mated together by way of a quick release coupling. However, in the embodiment depicted in FIGS. 16-18, first sleeve member 22 is mounted in first frame member 10 such that first sleeve longitudinal axis 107 is substantially perpendicular to first longitudinal axis 108 (see FIGS. 12-15 for more detail). First sleeve member 22 is generally secured to first frame member 10 by bolts, rivets (see, for example, rivets 33), adhesives, welds or the like to provide a substantially rigid connection. As illustrated, for example, in FIGS. 16-18, this arrangement allows first frame member 10 and second frame member 12 to be mated in a substantially face-to-face relationship, as distinguished from, for example, a mitered corner or a more end-to-end relationship enabled by other embodiments. Gripping elements 40, 42, and 44 (see, for similar construction, FIGS. 8 and 9) engage a box rail channel running axially in second frame member 12.

Figure 17:
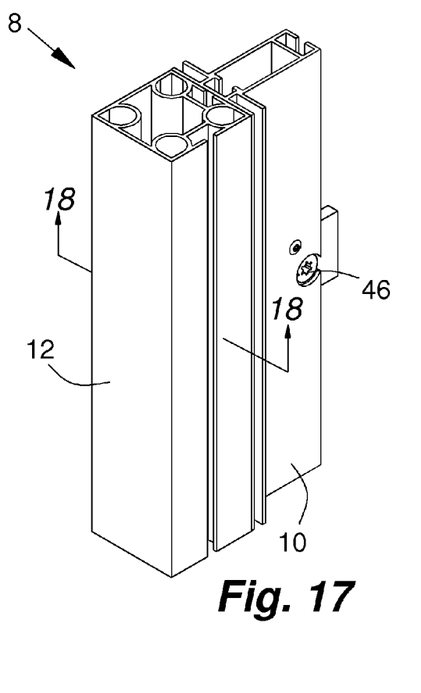
FIG. 17 is a further isometric view of the embodiment of FIG. 16.
Figure 18:
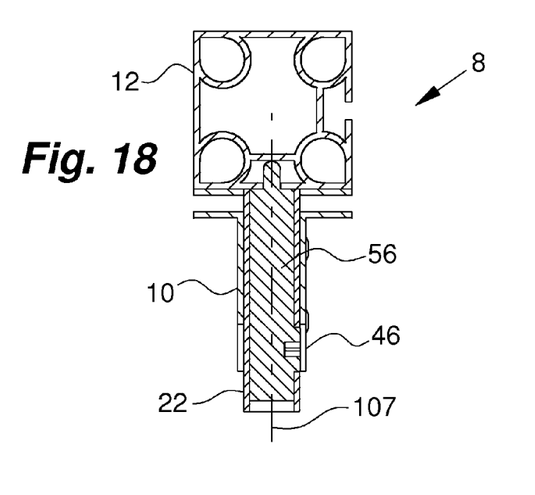
FIG. 18 is a cross-sectional view taken along line 18-18 in FIG. 17.
Figure 19:
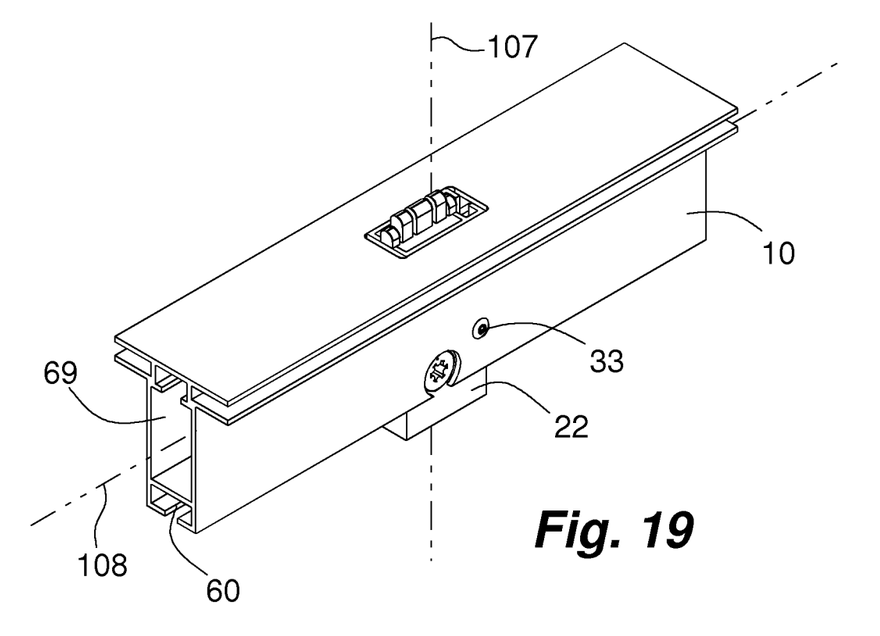
FIG. 19 is an isometric view similar to FIG. 13, but where the first frame member includes one less box rail channel.
Figure 20:
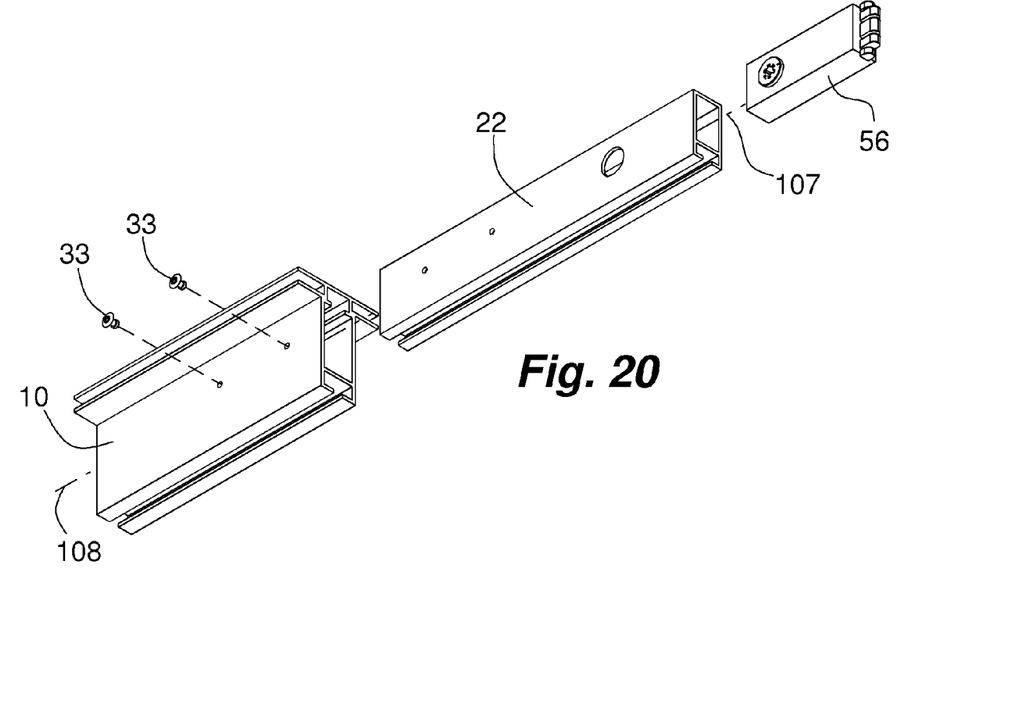
FIG. 20 depicts an exploded view of first frame member and associated sleeve and gripping members of an additional embodiment.
Figure 21:
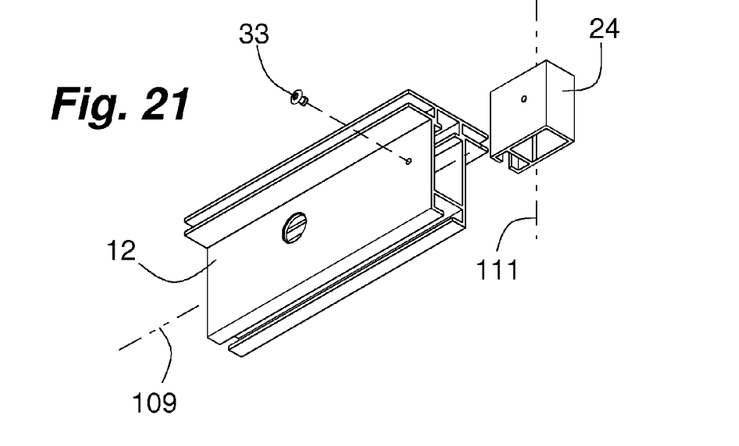
FIG. 21 depicts an exploded view of a second frame member and second sleeve member of an additional embodiment.

In addition to improving ease of frame construction, the embodiment illustrated in FIGS. 16-18 presents both structural and manufacturing advantages. With first sleeve member 22 acting as a structural interface between gripping member 56 and first frame member 10, loads applied to gripping member 56 are more broadly distributed to first frame member 10, particularly bending and torsional loads. This improvement in load distribution can help prevent the failure of thin-walled load bearing components within which a gripping member is mounted, such as first frame member 10. Further, turning now to FIGS. 12 and 13, with first sleeve member 22 as a structural interface between gripping member 56 and first sleeve member 10, the tolerances required to machine an opening in first frame member 10 sufficient to rigidly retain gripping member 56 in the proper gripping position are substantially reduced. Instead, the ultimate position of gripping member 56 can be fine-tuned by adjusting the relationship between first sleeve member 22 and first frame member 10, for example, just prior to securing first sleeve member 22 to first frame member 10. If this relationship needs to be corrected, rivets 33, for example, can be inexpensively removed and first sleeve member 22 re-drilled or recycled, rather than having to repair or recycle the much larger first frame member 10 as a result of an imprecise machining operation.

FIGS. 20-26 illustrate components and configurations relating to an additional embodiment of a frame joint system 8. Such an additional embodiment is shown in mated configuration generally at 8 in FIGS. 23 and 24, and in cross-sections in FIGS. 25 and 26. As with other embodiments, first frame member 10 and second frame member 12 are mated together by way of a quick release coupling. However, in the embodiment depicted in FIGS. 23 and 24, first sleeve member 22 is mounted in first frame member 10 such that first sleeve longitudinal axis 107 is substantially parallel to first longitudinal axis 108 (see FIG. 20 for the relationship between the axes), and second sleeve member 24 is mounted in second frame member 12 such that second sleeve longitudinal axis 111 is substantially perpendicular to second longitudinal axis 109 (see FIG. 21). Sleeve members 22 and 24 are generally secured to their respective frame members 10 and 12 by bolts, rivets (see, for example, rivets 33), adhesives, welds or the like to provide a substantially rigid connection. As illustrated, for example, in FIGS. 22-24 and 26, this arrangement allows first frame member 10 and second frame member 12 to be mated in an end-to-end relationship, as distinguished from, for example, a mitered corner or a more face-to-face relationship enabled by other embodiments. Gripping elements 40, 42, and 44 (see, for similar construction, FIGS. 8 and 9) engage a box rail channel running axially in second sleeve member 24.

For purposes of ease of illustration, the frame members have been depicted as straight with one gripping member per joint. As will be understood by those skilled in the art, arcuate frame members can be employed. The frame members can be arcuately formed so that they are within plane 110, or they can curve out of plane 110 in a direction that is normal to this plane or at any other angle or combination of angles, as may be desired. In certain embodiments, the joints form 90 degree corner angles. According to certain embodiments, particularly where large frames are involved, more than one gripping member can be used at each joint. The gripping members can be located on the same side of the joint, or there can be one or more gripping members on each side of the joint.

The foregoing detailed description of the invention is intended to be illustrative and not intended to limit the scope of the invention. Changes and modifications are possible with respect to the foregoing description, and it is understood that the invention may be practiced otherwise than that specifically described herein and still be within the scope of the claims.

What is claimed is:

1. A frame joint system including a quick release coupling, said frame joint system comprising:

a first frame member, said first frame member being elongated and hollow with a first longitudinal axis and first and second ends, said first and second ends being generally opposed to one another, said first frame member having a substantially constant first cross-sectional profile including a first frame cavity extending axially within said first frame member, said first frame cavity having a closed cross-sectional profile and opening axially, at least a first artifact mounting channel extending axially in said first frame member and opening laterally, said first end being beveled at approximately a predetermined angle;

a first sleeve member, said first sleeve member being elongated and hollow with a first sleeve longitudinal axis and proximal and distal ends, said first sleeve member having a substantially constant first sleeve cross-sectional profile including a sleeve cavity extending axially within said first sleeve member, said sleeve cavity having a closed cross-sectional profile and opening axially, said first sleeve member being axially slidably received and retained in said first frame cavity with said proximal end adjacent said first end, a socket portion of said first frame cavity extending from said first sleeve member through said beveled first end;

a gripping member axially slidably received and retained in said sleeve cavity, said gripping member including a housing member and a plurality of gripping elements projecting beyond said proximal end, said gripping elements adapted to being actuated with respect to said housing member between gripping and released configurations;

a second frame member including a second longitudinal axis and first and second frame ends, said second frame member having a second cross-sectional profile that is substantially the same as said first cross-sectional profile including a second frame cavity extending axially within said second frame member, at least a second artifact mounting channel extending axially in said second frame member and opening laterally, said first frame end being beveled at approximately a predetermined angle; and a second sleeve member having a second sleeve cross-sectional profile that is substantially similar to said first sleeve cross-sectional profile including a box rail element opening laterally of said second sleeve member, said second sleeve member being axially slidably received and retained in said second frame cavity such that said box rail element extends substantially parallel to said second artifact mounting channel, said second sleeve member projecting axially from said first frame end for sliding received engagement of said second sleeve member by said socket portion, said first end and said first frame end being adapted to mate with one another with said gripping elements in said gripping configuration with said box rail element and said second sleeve member received by said socket portion such that said box rail element extends substantially transversely to said first longitudinal axis, thereby rigidly securing said first end and said first frame end from rotating with respect to one another, wherein said first and second artifact mounting channels extend substantially continuously through said frame joint.

2. A frame joint system of claim 1 wherein said first end is beveled at approximately 45 degrees.

3. A frame joint system of claim 1 wherein said gripping member is axially slidably received and releasably retained in said sleeve cavity.

4. A frame joint system of claim 1 wherein said first and second sleeve members are substantially shorter than the frame members in which they are received.

5. A frame joint system including a quick release coupling, said frame joint system comprising:

a first frame member, said first frame member being elongated with a first longitudinal axis and first and second ends, said first and second ends being generally opposed to one another, said first frame member having a first frame cavity extending generally axially within said first frame member, said first frame cavity having a closed cross-sectional profile and opening axially, said first end being beveled at approximately a 45 degree angle generally along a joint plane;

a first sleeve member, said first sleeve member being elongated with a second longitudinal axis and proximal and distal ends, said first sleeve member including a sleeve cavity extending generally axially within said first sleeve member, said sleeve cavity having a closed cross-sectional profile and opening axially, said first sleeve member being axially slidably received and retained in said first frame cavity with said proximal end adjacent said first end, a socket portion of said first frame cavity extending from said first sleeve member through said beveled first end;

a gripping member axially slidably received and retained in said sleeve cavity, said gripping member including a housing member and a plurality of gripping elements projecting beyond said proximal end, said gripping elements adapted to being actuated with respect to said housing member between gripping and released configurations;

a second frame member including a third longitudinal axis and first and second frame ends, said second frame member including a second frame cavity extending axially within said second frame member, said first frame end being beveled at approximately a 45 degree angle; and a second sleeve member including a box rail element opening laterally of said second sleeve member, said second sleeve member being axially slidably received and retained in said second frame cavity such that said box rail element extends at approximately a 45 degree angle with respect to said beveled first frame end, said second sleeve member projecting axially beyond said first frame end through said joint plane;

wherein said first end and first frame end are adapted to mate with one another generally along said joint plane to form an approximately right-angled mitered joint with said gripping elements in said gripping configuration with said box rail element and said second sleeve member received by said socket portion, thereby rigidly securing said first end and said first frame end from rotating with respect to one another along and out of said joint plane.

6. A frame joint system including a quick release coupling, said frame joint system comprising:

first and second frame members, said first and second frame members being elongated and including first and second generally axially extending frame cavities, respectively, and beveled ends, each said frame cavity having a closed cross-sectional profile and opening axially, said beveled ends adapted to being abutted against one another generally along a joint plane to define an approximately right angled mitered joint;

first and second sleeve members, said first and second sleeve members being elongated and including first and second proximal ends, respectively, said first sleeve member including an axially extending sleeve cavity, said second sleeve member including a laterally opening axially extending box rail element, said first sleeve member being axially slidably received and retained in said first axially extending frame cavity with said first proximal end adjacent said beveled end of said first frame member, a socket portion of said first frame cavity between said first proximal end and said joint plane, said second sleeve member being axially slidably received and retained in said second axially extending frame cavity such that said box rail element extends in non-parallel fashion with respect to said beveled end of said second frame member and said second proximal end projects axially beyond the beveled end of said second frame member to define a generally triangular prismatic boss portion adapted to project generally laterally into said socket portion; and a gripping member mounted to said first sleeve member, said gripping member including a housing member, an eccentric member rotatably mounted therein, and a plurality of gripping elements separated spatially and angularly from said joint plane, said gripping elements adapted to engage said laterally opening axially extending box rail element and to being actuated with respect to said housing member between a gripping configuration and a released configuration;

said frame joint system having an assembled configuration in which:
said boss portion is received within said socket portion and secured thereat by way of said gripping elements being in said gripping configuration with said box rail element,
said box rail element extends substantially normally to the first longitudinal axis, and
said right angled mitered joint is rigid; and
wherein said gripping member is adapted to remain mounted to said first sleeve member throughout transition of said frame joint system into and out of said assembled configuration.

7. A frame joint system of claim 6 wherein said gripping member is releasably retained in said first sleeve cavity.

8. A frame joint system including a quick release coupling, said frame joint system comprising:
first and second frame members, said first and second frame members being elongated, having major axes, respectively including first and second axially extending frame cavities, and each including at least a beveled end, each said frame cavity having a closed cross-sectional profile and opening axially, said respective beveled ends adapted to being abutted against one another generally along a joint plane to define an approximately right angled mitered joint, said first frame member including therein a socket portion adjacent its beveled end;
a sleeve member, said sleeve member including a laterally opening axially extending box rail element, said sleeve member being mounted to said second frame member such that said box rail element extends in non-parallel fashion with respect to said beveled end of said second frame member, said sleeve member projecting generally axially beyond the beveled end of said second frame member to form a generally triangular prismatic boss portion, said boss portion adapted to project generally laterally into said socket portion; and
a plurality of gripping elements located generally within said socket portion and generally separated from said joint plane, said gripping elements engaging said laterally opening axially extending box rail element in a gripping configuration when said boss portion is projected into said socket portion, and said gripping elements adapted to being actuated between said gripping configuration and said released configuration with respect to said box rail element, wherein said gripping elements are located in at least one gripping member, said gripping member having a housing member, an eccentric member and a leaf spring element, and respective said gripping elements are adapted to being actuated with respect to said housing member;
wherein said socket portion is adapted to receive said boss portion thereby bringing external side walls of said boss portion into close sliding engagement with internal side walls of said socket portion so that said sleeve member prevents said first and second frame members from rotating out of said joint plane when said frame joint system is in an assembled configuration.

9. A frame joint system of claim 8 wherein an area of gripping engagement between said gripping elements and said laterally opening axially extending box rail element is separated spatially and angularly from said joint plane.

10. A frame joint system of claim 8 wherein said sleeve member is nested within said second frame member.

11. A frame joint system of claim 8 wherein said first and second frame members each include opposed beveled ends.

12. A frame joint system of claim 8 wherein at least one of said first and second frame members is arcuate.

13. A frame joint system of claim 8 wherein said gripping elements are located in at least two separate gripping members.

* * * * *